(12) United States Patent
Latorre-Costa

(10) Patent No.: US 10,243,931 B2
(45) Date of Patent: Mar. 26, 2019

(54) GROUND UNIT, AIRCRAFT AND METHOD FOR TRANSMITTING FLIGHT INSTRUCTIONS FROM A GROUND UNIT TO AN AIRCRAFT

(71) Applicant: Airbus Operations SAS, Toulouse (FR)

(72) Inventor: Pau Latorre-Costa, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 123 days.

(21) Appl. No.: 15/471,974

(22) Filed: Mar. 28, 2017

(65) Prior Publication Data
US 2017/0295145 A1    Oct. 12, 2017

(30) Foreign Application Priority Data
Apr. 8, 2016    (FR) ..................... 16 53129

(51) Int. Cl.
| | |
|---|---|
| *H04L 29/06* | (2006.01) |
| *G06K 7/14* | (2006.01) |
| *G06K 19/06* | (2006.01) |
| *H04L 9/14* | (2006.01) |
| *H04L 9/30* | (2006.01) |
| *G08G 5/00* | (2006.01) |
| *B64D 45/00* | (2006.01) |

(52) U.S. Cl.
CPC ........ *H04L 63/0428* (2013.01); *G06K 7/1404* (2013.01); *G06K 19/06009* (2013.01); *G08G 5/0017* (2013.01); *H04L 9/14* (2013.01); *H04L 9/30* (2013.01); *B64D 2045/0085* (2013.01)

(58) Field of Classification Search
CPC ......... H04L 63/0428; H04L 9/14; H04L 9/30; G06K 7/1404; G06K 19/06009; G08G 5/0017
See application file for complete search history.

(56) References Cited

U.S. PATENT DOCUMENTS

| | | | |
|---|---|---|---|
| 6,094,608 A | 7/2000 | Bomans et al. | |
| 8,892,273 B1 * | 11/2014 | Raghu ................... | B64D 43/00 235/462.01 |

(Continued)

FOREIGN PATENT DOCUMENTS

EP    2131300    12/2009

OTHER PUBLICATIONS

Mahmoud et al., A performance-aware Public Key Infrastructure for next generation connected aircrafts, Oct. 2010, 29th Digital Avionics Systems Conference, pp. 3.C.3-1-3.C.3-16 (Year: 2010).*

(Continued)

*Primary Examiner* — Kenneth W Chang
(74) *Attorney, Agent, or Firm* — Greer, Burns & Crain Ltd.

(57) ABSTRACT

The transmission of flight instructions from a ground unit to an aircraft comprising an onboard system. The ground unit is configured to generate, on the basis of flight data intended for the aircraft, at least one optical symbol containing a flight instruction. The onboard system comprises an optical reader and a flight management system. The optical reader is configured to read the optical symbol and to transfer the flight instruction contained in the symbol to the flight management system to prepare the flight of the aircraft.

13 Claims, 4 Drawing Sheets

(56) References Cited

U.S. PATENT DOCUMENTS

| | | | | |
|---|---|---|---|---|
| 2003/0201365 A1* | 10/2003 | Nelson | ............... | B64D 45/0015 244/118.5 |
| 2008/0117858 A1* | 5/2008 | Kauffman | .......... | H04B 7/18504 370/316 |
| 2009/0092074 A1* | 4/2009 | Jamalipour | ........ | H04B 7/18506 370/316 |
| 2010/0039438 A1* | 2/2010 | Kennedy | ............... | G09B 29/006 345/581 |
| 2012/0177198 A1* | 7/2012 | Cabos | ................... | H04L 9/0825 380/270 |
| 2014/0163852 A1* | 6/2014 | Borri | .................... | G05D 1/0022 701/120 |
| 2015/0334113 A1* | 11/2015 | Angus | ................. | H04L 63/0428 713/168 |
| 2015/0360796 A1 | 12/2015 | Huet et al. | | |
| 2017/0063529 A1* | 3/2017 | Nguyen | ............... | G08G 5/0013 |

OTHER PUBLICATIONS

French Search Report, Aug. 18, 2016, priority document.
"Aviation Cyber Physical Systems: Foundations for Future Aircraft and Air Transport", Krishna et al., Aug. 1, 2013.

\* cited by examiner

GROUND UNIT, AIRCRAFT AND METHOD FOR TRANSMITTING FLIGHT INSTRUCTIONS FROM A GROUND UNIT TO AN AIRCRAFT

CROSS-REFERENCES TO RELATED APPLICATIONS

This application claims the benefit of the French patent application No. 1653129 filed on Apr. 8, 2016, the entire disclosures of which are incorporated herein by way of reference.

BACKGROUND OF THE INVENTION

The present invention relates to a ground unit, an aircraft and a method for transmitting flight instructions from a ground unit to an aircraft.

More precisely, the invention is intended for the transmission of flight instructions to an onboard flight management system FMS ("FMS" standing for "Flight Management System" in English), of the avionics type (that is to say which is secured in such a way as to obey given constraints, notably of integrity and availability).

It is known that in order to prepare a flight, an airline company records flight instructions in an electronic flight device of the EFB type ("EFB" standing for "Electronic Flight Bag" in English), or any other portable computer or touch tablet. The crew, during the preparation of the aircraft for the flight, copies the data (coming from the flight instructions) displayed on the screen of the flight device into the FMS system, via a man/machine interface of the aircraft.

Such a loading of data is a large workload for the crew, thus generating a loss of time during the preparation of the flight.

SUMMARY OF THE INVENTION

The purpose of the present invention is to overcome this disadvantage. It relates to the transmission of flight instructions from a ground unit to an aircraft comprising an onboard system.

The ground unit for transmitting flight instructions to the aircraft comprises a central processing unit configured for generating at least one flight instruction, and means of generating an optical symbol, connected to the central processing unit, configured for generating each flight instruction in the form of an optical symbol.

The aircraft comprises an onboard system able to read flight instructions generated by the ground unit, the onboard system comprising a flight management system configured for automating avionics functions of the aircraft on reception of a flight instruction, the onboard system comprising an optical reader and a flight management system, the optical reader being configured for extracting a flight instruction contained in an optical symbol and transferring the instruction to the flight management system in order to prepare the flight of the aircraft.

The invention makes it possible to transfer flight instructions from the ground unit to the onboard system of the aircraft quickly and in a secure manner. This reduces the workload of the crew, thus allowing the crew to save time during the preparation of the aircraft while being more efficient (notably by avoiding inputting errors, etc.).

BRIEF DESCRIPTION OF THE DRAWINGS

Other advantages and features of the invention will become apparent in the following detailed and non-limiting description. This description will be given with reference to the appended drawings in which.

DETAILED DESCRIPTION OF THE PREFERRED EMBODIMENTS

Figure 1:
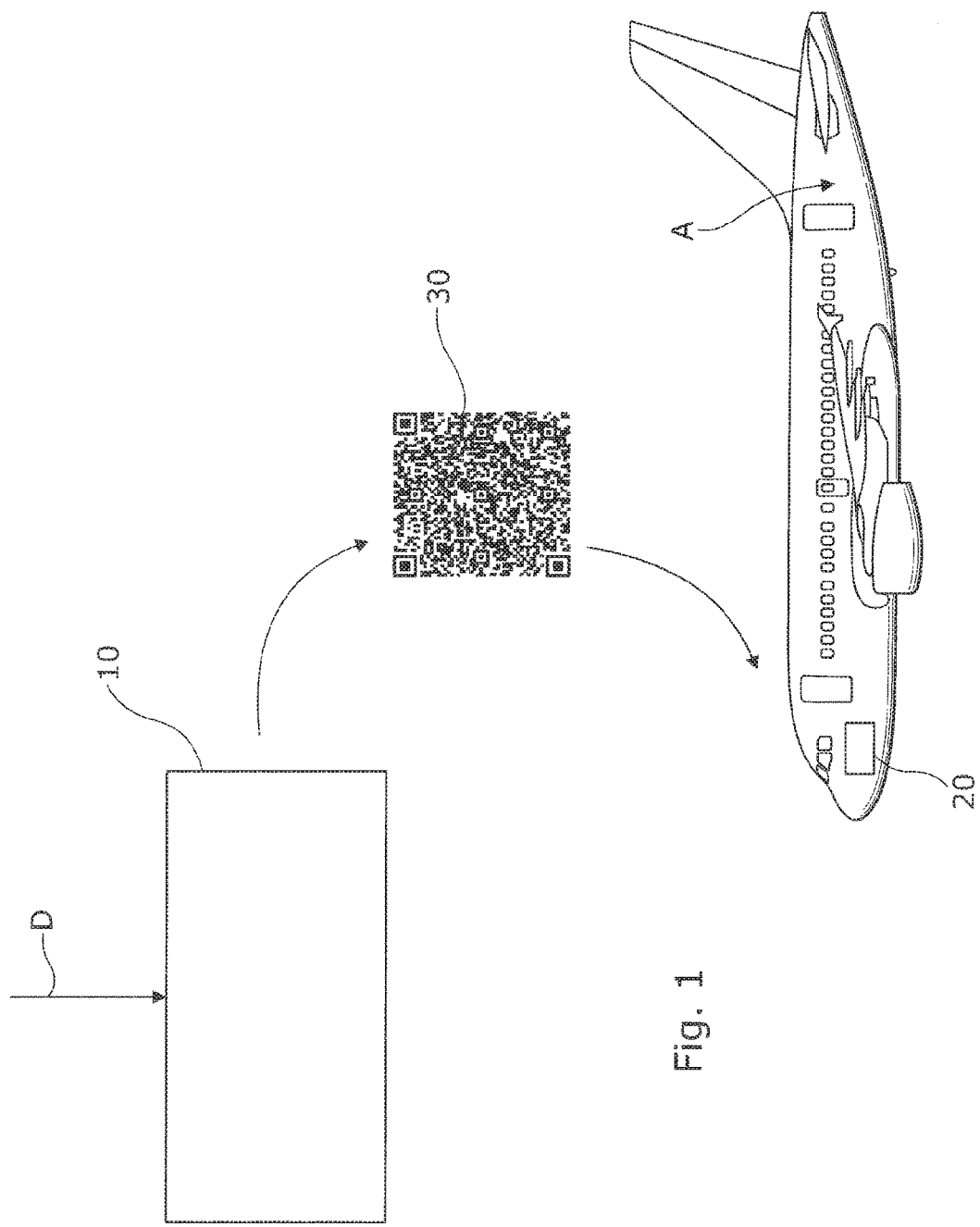
FIG. 1 is the block diagram, according to one embodiment of the invention, of a ground unit and an aircraft comprising an onboard system, the ground unit generating flight instructions intended for the onboard system.

With reference to FIG. 1, the invention relates to the transmission of flight instructions between a ground unit 10 and an aircraft A comprising an onboard system 20.

The ground unit 10, for example based on an airport, and the aircraft A belong to the same entity. An "entity" is defined in the continuation of the description as being, for example, an airline company or an air operations center, which comprises several aircraft, each one being equipped with an onboard system 20, and several ground units 10. The securing of the data exchanges between the members of this entity is carried out by encryption protocols known only by the entity as will be described later in the description.

The ground unit 10 is configured for generating, on the basis of flight data D received from the entity and intended for the aircraft A, at least one optical symbol 30 containing a flight instruction. The onboard system 20 in the aircraft A is configured for reading optical symbols in order to extract the flight instructions from them and thus to prepare the flight of the aircraft A. The flight data D transmitted by the ground unit 10, for example in the form of a bit stream, are of different types, for example flight plan data, aircraft performance data, takeoff data, or wind/meteorological data. Each flight instruction generated by the ground unit 10 refers to a single type of data with the result that the preparation of the flight of an aircraft A necessitates the generation of several optical symbols.

Figure 2:
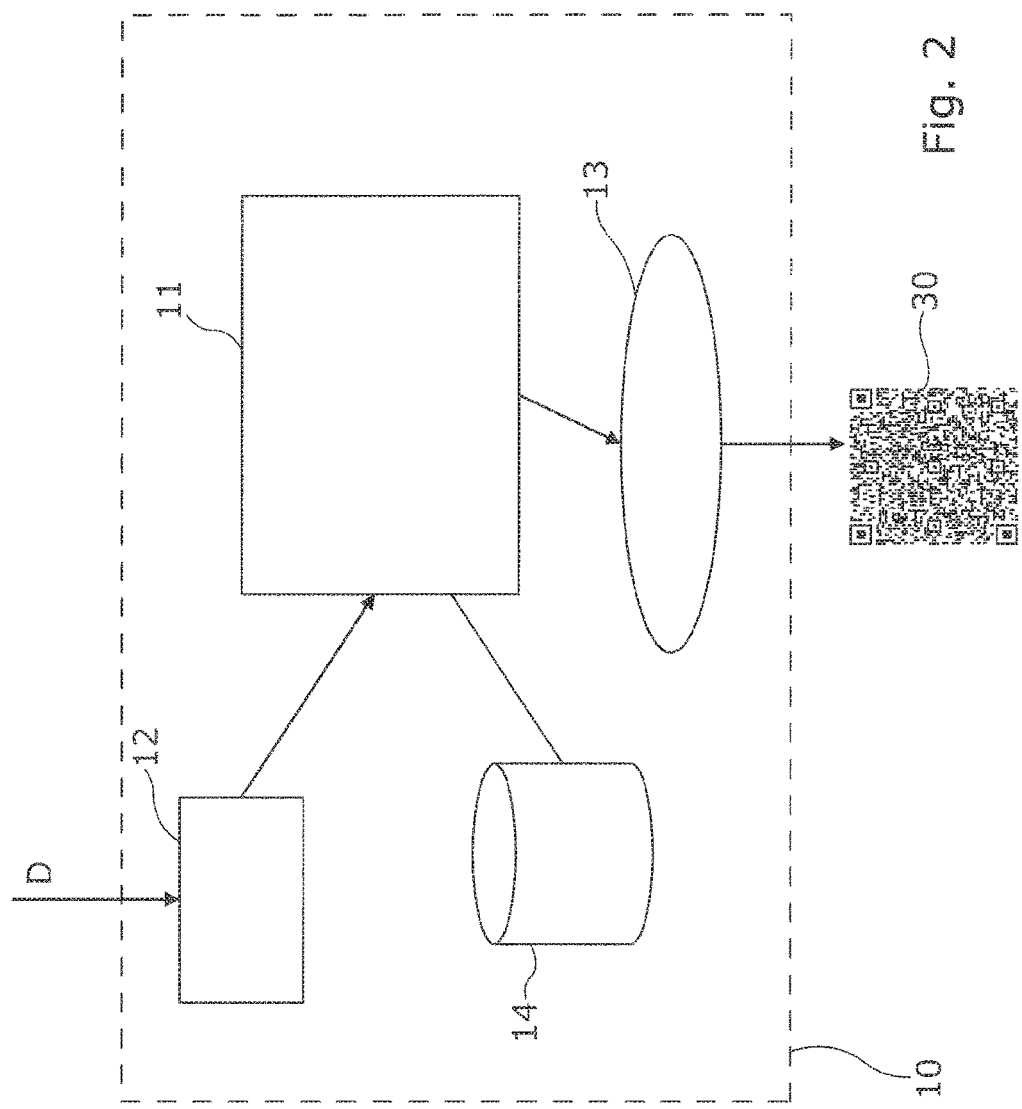
FIG. 2 is the block diagram of the ground unit shown in FIG. 1.

With reference to FIG. 2, the ground unit 10 comprises a central processing unit 11 connected to a receiver 12 for receiving flight data D, to optical signal generation means 13 and to a database 14 whose data comprise a list of public keys and of aircraft A (recorded in the database via their identifier) belonging to the entity, each key being associated with a unique aircraft.

The receiver 12 is, for example, a terminal equipment of the Internet network when the central processing unit 11 receives flight data D from the entity via the Internet. The central processing unit 11 converts, via, for example, the execution of appropriate software, the flight data D into flight instructions containing the data transcribed into the form of character strings readable by the onboard device 20, for example, written according to a format defined by the ARINC 702 protocol.

Each flight instruction, generated by the ground unit 10, comprises a header which is a function of the type of flight data D contained in the instruction, that is to say, of the type of flight data sent by the entity with, for example, according to the aforesaid protocol, a header (called FPN) for flight plan data, a header (called PER) for aircraft performance data, a header (called LDI) for takeoff data, and a header PWI (called PWI) for wind/meteorological data.

The central processing unit 11 uses a signature algorithm, an encoding algorithm and a printing algorithm for encrypting (signing and encoding) a flight instruction and for printing the encrypted flight instruction in the form of an optical symbol 30, for example a bar code of the QR code (or Data Matrix code) type.

The execution of the signature algorithm comprises applying a hash function (called "hashing" function, for example a function of the MD5 or SHA-1 type) to the flight instruction in order to compute the hash value (or "digest") of the flight instruction and then to encode, via an asymmetric encryption algorithm (of the RSA type), the hash value thus computed by encoding it with a private key of the ground unit 10. The encoded hash value forms a signature of the flight instruction.

The execution of the encoding algorithm comprises encoding the flight instruction and its signature with the public key, coming from the database 14, of the aircraft A to which the entity wishes to provide flight data D.

The execution of the translation algorithm generates instructions for the optical signal generation means 13 in order to generate an optical symbol 30 containing the flight instruction and its signature encoded and intended to be provided to the crew of the aircraft A to which the entity wishes to provide data. The optical symbol generation means 13 generate the optical symbol 30 in the form of a paper document (the generation means are then a printer), or in a digital format downloaded into an electronic flight device of the EFB type, or any other portable computer or touch tablet (the generation means are then a software interface).

The onboard system 20 in the aircraft A is configured for reading an optical symbol 30 coming from the ground unit 10, extracting the encrypted flight instruction contained in the optical symbol, decrypting it (decoding and authentication) with a public key of the ground unit 10 and with a private key of the aircraft A and for preparing the flight of the aircraft using the data contained in the flight instruction.

Figure 3:
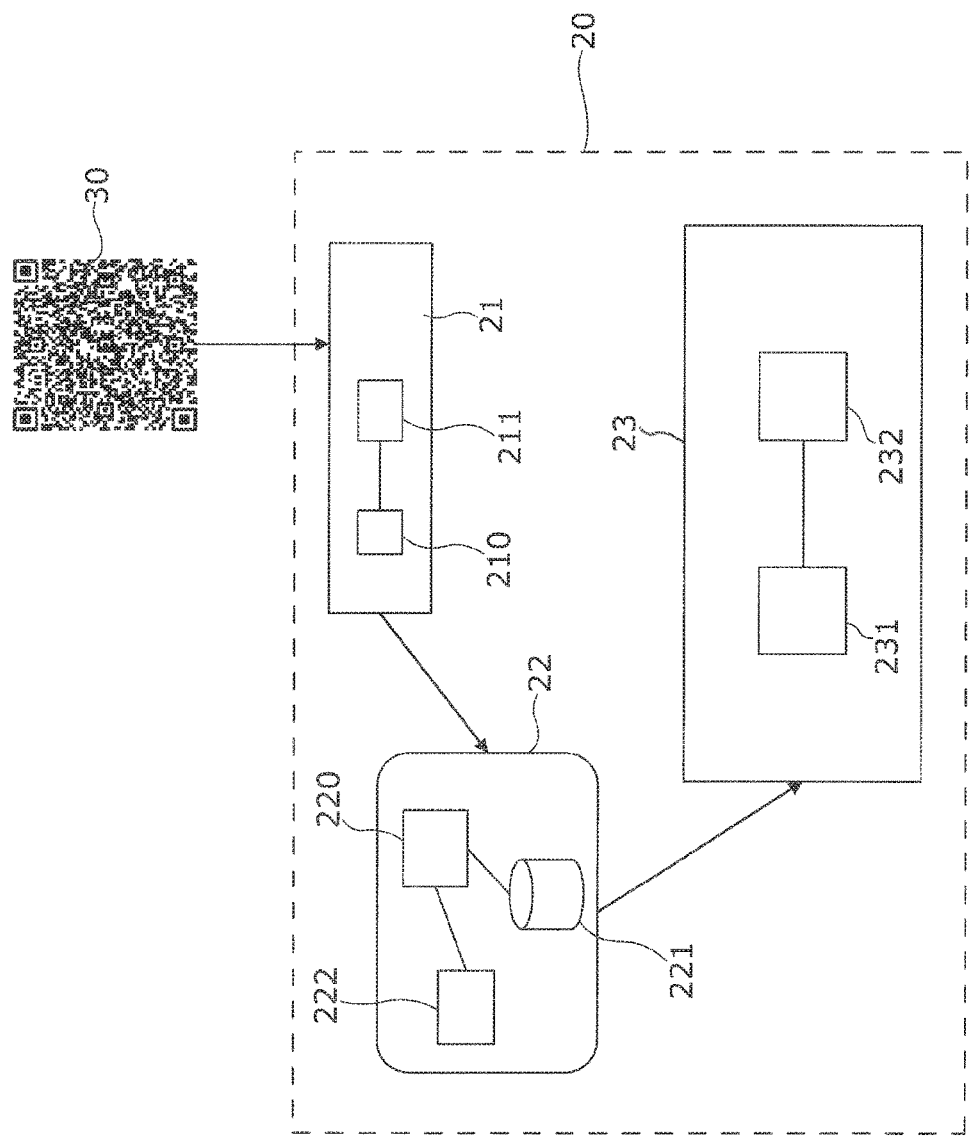
FIG. 3 is the block diagram of the onboard system shown in FIG. 1.

For this purpose, and with reference to FIG. 3, the onboard system comprises an optical reader 21 for reading optical symbols 30, the reader being connected to a flight management system 23 of the FMS type through a securization unit 22 configured for authorizing or not the transfer of data from the optical reader 21 to the flight management system 23. The connections between the different elements of the onboard system 20 are, for example, conforming to the ARINC 429 standard.

The flight management system 23 is configured for, on the basis of a flight instruction complying with the ARINC 702 protocol and comprising flight data D, automating avionics functions of the aircraft, according to the type of flight data (header) in the flight instruction. Thus, for example, on reception of a flight instruction having an FPN header, for example, the flight management system 23 automates the navigation function of the aircraft by programming the flight plan that the automatic pilot will follow. The flight management system comprises a screen 231 arranged in the cockpit of the aircraft A and a control interface 232 (conventional man-machine interface) so that the crew can, via the control interface 232, validate the flight data displayed on the screen resulting from the downloading of a flight instruction into the onboard system 20.

The optical reader 21 comprises a microcontroller 210 connected to a camera 211, for example a digital camera. The microcontroller 210 implements an algorithm for the recognition of optical symbols 30 captured by the camera 211 in order to decode, with a private key of the aircraft A, the flight instruction contained in an optical signal 30 captured by the camera 211. The optical reader 21 is thus configured for detecting, via the camera 211, a QR code and transmitting the flight instruction and its signature encoded and contained in the QR code to the securization unit 22 solely if the encoded flight instruction and its signature can be decoded with the private key of the aircraft.

The securization unit 22 comprises a control unit 220 (of the central processing unit type) and, connected to the unit, a database 221 and satellite positioning means 222, for example of the GPS or GLONASS type. The satellite positioning means are preferably those of the aircraft.

The data of the database 221 comprise a list of public keys and coordinates of the ground units 10 of the entity, each key being associated with a unique ground unit, and satellite positioning means 222, for example of the GPS or GLONASS type. The satellite positioning means are preferably those of the aircraft.

The control unit 220 implements different algorithms in order to authenticate (i.e., to check that the flight instruction actually comes from a ground unit 10 of the entity) the signature of a flight instruction transmitted by the optical reader 21. For this purpose, a first algorithm, called a hash value computation algorithm, comprises applying a hash function (the same as the one applied by the central processing unit of the ground unit for the execution of the signature algorithm) to the flight instruction and computing a hash value (or "digest"), called the first hash value, of the flight instruction.

A second algorithm, called a search algorithm, retrieves the coordinates of the position of the aircraft A provided by the satellite positioning means 222 and compares these coordinates with the coordinates of the different ground units 10 written in the database 221 in order to determine which ground unit 10 has coordinates closest to those of the coordinates of the position of the aircraft A and extracts, from the database 221, the public key of the determined ground unit 10 as being the one having coordinates closest to the coordinates of the position of the aircraft A.

A third algorithm, called a decrypting algorithm, comprises using the public key of the ground unit 10 obtained by the execution of the search algorithm in order to decode the signature of the flight instruction received from the optical reader 21 by using the same asymmetric encryption algorithm as the one applied by the central processing unit 11 of the ground unit for the execution of the signature algorithm. The result of this third algorithm is the obtaining of a hash value, called the second hash value.

A fourth algorithm, called a comparison algorithm, comprises comparing the first and second hash values in order to guarantee, the both hash values are similar, the authenticity of the signature of the flight instruction transmitted by the optical reader 21. In the case where the signature of the flight instruction is guaranteed as being authentic, then the control unit transmits the flight instruction to the flight management system 23.

Figure 4:
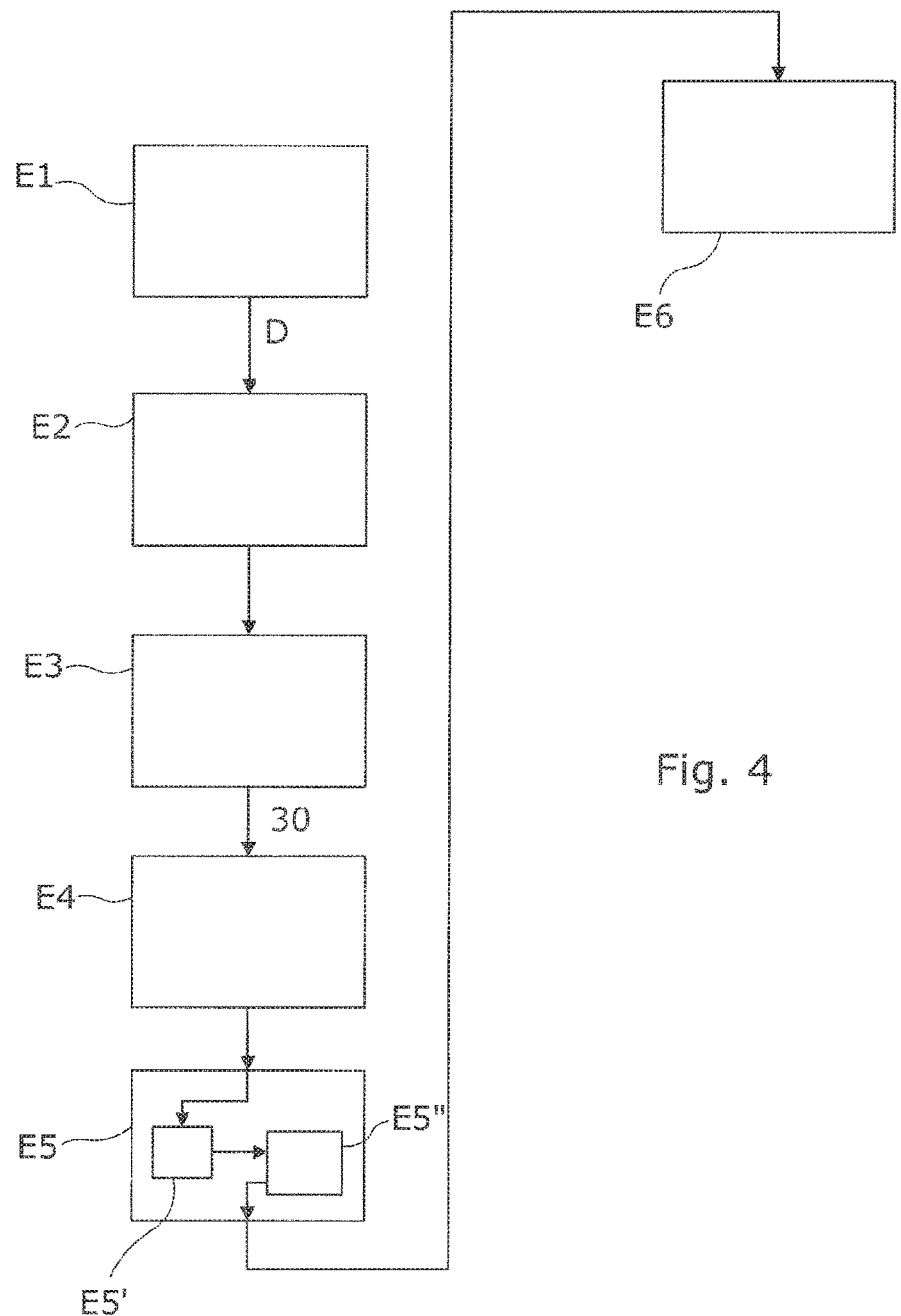
FIG. 4 shows the different steps of a method of transmitting flight instructions between the ground unit and the onboard system in an aircraft according to one embodiment of the invention.

A method for transmitting flight instructions between a ground unit 10 and an aircraft A will now be described with reference to FIG. 4.

In a flight preparation step E1, an operator of the entity generates various flight data D intended for the aircraft A of the entity, called the destination aircraft.

In a transmission step E2, the various flight data D are transmitted in the form of a data bitstream to the receiver 12 of the ground unit 10, each data bitstream having a header which is a function of the type of data D transmitted. The central processing unit 11 of the ground unit 10 generates a flight instruction for each bitstream, each flight instruction also having, as described above, a header which is a function of the type of flight data D transmitted.

As described above, and in a generation step E3, the ground unit 10 generates, via the optical symbol generation means 13 and for each flight instruction, an optical symbol 30 containing the encoded flight instruction (that is to say, the flight instruction and its signature encoded with the public key of the destination aircraft A). For this purpose, the central processing unit 11 implements the signature, encoding and translation algorithms such as described above for the encryption of the flight instruction.

In a delivery step E4, an operator delivers each optical symbol 30 (via paper documentation or by uploading into an electronic device of the crew) to the crew of the destination aircraft A.

In a reading step E5, the crew of the aircraft A passes each symbol in front of the camera 211 of the optical reader 21 of the onboard system 20 in order to retrieve the encoded flight instruction and signature of the encoded flight instruction contained in the symbol 30. In this step, the onboard system 20 decrypts (decoding and authentication) the flight instruction contained in the optical symbol. For this purpose:
  in a first sub-step, called the decoding sub-step E5', the microcontroller 211 of the optical reader 21 decodes, with a private key of the destination aircraft A, the encoded flight instruction and signature of the flight instruction contained in each symbol and transfers the (decoded) flight instruction and signature to the securization unit 22 of the onboard system if the private key decodes the encoded flight instruction and signature contained in the symbol;
  in a second sub-step, called the authentication sub-step E5", the control unit 220 of the securization unit 22 authenticates, for each flight instruction and signature of the flight instruction received from the optical reader 21, the signature of the flight instruction and transfers the flight instruction to the flight management system 23 of the onboard system if the signature is authenticated.

For this purpose, the control unit 220 implements the algorithms for computation of the hash value, searching, decrypting and comparison such as described above.

Thus, in the case where the onboard system cannot decrypt (that is to say decode (step E5') and authenticate (step E5")) a flight instruction resulting from reading an optical symbol 30, the flight instruction is not transmitted to the flight management system 23. In this way, it is ensured that the flight instruction is addressed solely to the destination aircraft A and that it has been generated by the authorized ground unit.

On the other hand, if a flight instruction resulting from the reading of an optical symbol 30 is decrypted (flight instruction decoded and its signature authenticated), then the flight instruction is uploaded into the flight management system 23 which, as a function of the header of the flight instruction, automates the appropriate navigation functions of the aircraft A.

In a validation step E6, the flight data coming from a flight instruction uploaded into the flight management system 23, are displayed on the screen in the cockpit so that the crew can validate them via the control interface.

The method for transmitting flight instructions according to the invention makes it possible to initialize the flight management system 23 in a fast and secured manner. In fact, once in the aircraft, instead of manually typing in the flight data D via an interface of the flight management system 23, the crew passes the optical symbols 30 provided by the ground unit 10 in front of the optical reader 211 in order to transfer all of the information necessary for the preparation of the flight to the flight management system 23.

Thus, the invention makes it possible to transfer, rapidly and in a secured manner, flight data D from the ground to the flight management system 23 of the aircraft. This reduces the workload of the crew, thus allowing the crew to save time during the preparation of the aircraft, while being more efficient (notably by avoiding inputting errors, etc.).

In a variant of the invention which is not shown in the figures, the optical reader 21 comprises a switch associated with a clock. Operating the switch has the effect of activating the reader for a predetermined time determined by the clock, of the order of about ten seconds. The advantage of this variant is to avoid any involuntary reading of an optical symbol 30.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A ground unit for transmitting flight instructions to an aircraft comprising an onboard system, comprising:
  a receiver configured to receive a flight data via a transmitted data bitstream;
  a central processing unit configured to generate at least one flight instruction based on the flight data,
  a database of a plurality of aircraft and a plurality of public keys, each key associated with a unique aircraft from the plurality of aircraft, the database being in communication with the central processing unit,
  means of generating an optical symbol, connected to the central processing unit and configured for generating each flight instruction in a form of an optical symbol, wherein each flight instruction includes a public key from the plurality of public keys; and
  means of encrypting, with a private key of the ground unit and with a public key from the plurality of public keys, the at least one generated flight instruction.

2. The ground unit according to claim 1, wherein the optical symbol is a QR code.

3. The ground unit according to claim 1, wherein the at least one flight instruction contains flight data transcribed in a form of character strings readable by an onboard device of an aircraft, each flight instruction, generated by the ground unit, comprising a header which is a function of a type of flight data of the instruction.

4. An aircraft, comprising:
  an onboard system configured to read flight instructions generated by a ground unit, wherein the onboard system comprises an optical reader, a database of public keys and coordinates for a plurality of ground units, and a flight management system, each public key being associated with a unique ground unit, the optical reader configured to extract a flight instruction contained in an optical symbol and to transfer the flight instruction to the flight management system to prepare the flight of the aircraft, and, the flight management system configured to automate at least one avionics functions of the aircraft in response to a reception of the flight instruction from the optical reader which has been authenticated with a public key from database of public keys.

5. The aircraft according to claim 4, wherein the onboard system is configured to decrypt, with a public key of the ground unit from the database and with a private key of the aircraft an optical symbol to obtain the flight instruction.

6. The aircraft according to claim 4, wherein the optical reader comprises a switch associated with a clock.

7. The aircraft according to claim 5, wherein the optical reader comprises a microcontroller connected to a camera, the microcontroller configured to implement an algorithm for recognition of optical symbols configured for decoding, with a private key of the aircraft, the optical symbol captured by the camera to obtain the flight instruction.

8. The aircraft according to claim 5, wherein the onboard system comprises a securization system connected between the optical reader and the flight management system, the unit being configured to authorize or not authorize transfer of the flight instruction from the optical reader to the flight management system.

9. The aircraft according to claim 4, wherein the optical symbol is a QR code.

10. The aircraft according to claim 4, wherein the at least one flight instruction contains flight data transcribed in a form of character strings readable by an onboard device of an aircraft, and wherein each flight instruction, generated by the ground unit, comprises a header which is a function of a type of flight data of the flight instruction.

11. A method for transmitting flight data from a ground unit to an aircraft comprising an onboard system, the method comprising the steps:

transmitting different flight data to a receiver of the ground unit via a data bitstream, the ground unit generating at least one flight instruction on a basis of the flight data, the at least one flight instruction containing flight data transcribed in a form of character strings readable by a flight management system of the aircraft, wherein each flight instruction, generated by the ground unit, comprises a header which is a function of a type of flight data of the flight instruction;

generating, by the ground unit, via optical symbol generation means and for each flight instruction, an optical symbol;

transferring each flight instruction to the onboard system of the aircraft by reading of the optical symbol, during which a crew of a destination aircraft passes each optical symbol generated by the ground unit in front of a camera of an optical reader of the onboard system in order to retrieve the flight instruction contained in the symbol, the retrieved instruction being uploaded into a flight management system of the aircraft;

validating by the crew of the flight data resulting from the uploading of a flight instruction into the flight management system which are displayed on a screen in a cockpit, via a control interface.

12. The transmission method according to claim 11, wherein the generating step comprises encrypting, with a private key of the ground unit and with a public key of the aircraft, of each flight instruction generated.

13. The transmission method according to claim 11, wherein the reading step comprises decrypting, with a public key of the ground unit and with a private key of the aircraft, of each flight instruction.

* * * * *